(No Model.)
F. W. HARDWICK.
PNEUMATIC TIRE.
No. 501,716. Patented July 18, 1893.
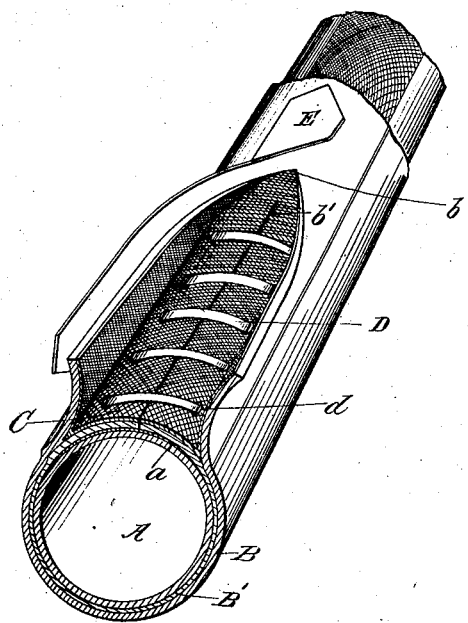
Attest:
A. H. Erb.
Reeve Lewis
Inventor:
F. W. Hardwick
by
his attorneys

UNITED STATES PATENT OFFICE.

FREDERICK W. HARDWICK, OF PASSAIC, NEW JERSEY, ASSIGNOR TO THE NEW YORK BELTING AND PACKING COMPANY, LIMITED, OF ENGLAND.

PNEUMATIC TIRE.

SPECIFICATION forming part of Letters Patent No. 501,716, dated July 18, 1893.

Application filed April 19, 1893. Serial No. 470,977. (No model.)

*To all whom it may concern:*

Be it known that I, FREDERICK W. HARDWICK, of the city and county of Passaic and State of New Jersey, have invented a new and useful Improvement in Pneumatic Tires, which is fully set forth in the following specification.

My invention relates to pneumatic tires, such as are adapted for use on bicycles, sulkies, buggies, &c.

As now frequently constructed, pneumatic tires contain an outer tube, incasing an inner tube, which is separable therefrom. The tire is slipped over the rim of the wheel, in the ordinary well known manner, and the rim, and that portion of the tire, which fits upon the same, are cemented together. That part of the tire, which is adjacent to the rim, is often spoken of as the rim part of the tire.
The outer tube of the tire has a slit, running along the center of the rim part of the tire for any convenient distance, whereby access can readily be obtained to the interior tube of the tire. This slit in the rim part of the outer tire is united by lacings, passed through holes near the edges of the slit. After the slit has been laced up, the tire is adjusted in position upon the rim, and cemented as aforesaid. In case of puncture to the tire, the tire is slipped off the rim, the lacing is taken out and the slit is opened, and the interior tube is removed through the slit, or so much of the same is removed as may be necessary. The interior tube is patched, or mended, by methods well known in the art, and is then returned to its proper position. The interior tube in such a tire as this, may either be continous, or it may have butted, or closed ends.

While the form of tire before described has advantages, which have given it popularity, there are certain objections thereto, which my invention is designed to obviate. The cement is apt to fill up, or obstruct the holes, or apertures for the lacings. Great force is then required to remove the lacings, and the lacings are apt to be broken. The lacings are liable to become rotted. By reason of the cement on the lacings and in the lacing holes, the removal and replacing of the lacings are much obstructed.

In my improved tire, the outer tube has preferably a number of slits therein of a convenient length, running along the center of the rim part of the outer tube. I have found four to be a convenient number. The outer tubes of tires of this description are ordinarily composed of more than one layer, either of rubber, or of fibrous material coated with rubber, or of both rubber and fibrous material, which are all united in the process of vulcanization.

The outer tire, at the sides of the slits, is separated into two parts along the edges of the slits, in the following manner: Between two of the layers forming the outer tube, there is inserted a straight piece of linen or other fibrous material of about the same length as the slit, the center of which passes approximately along the line of the slit, and which is wide enough to extend on either side to about the limit of the rim part of the tire, where on either side it is folded upward and over upon itself, and the two edges of the linen or other fibrous material come together or nearly together at about the line of the slit. Thus, on either side of the slit, the outer tube of the tire is strengthened by a double thickness of linen or other fibrous material. The slit may be made either before or after vulcanization. This strip should be inserted before vulcanization. The linen or fibrous material is friction-coated and becomes incorporated with, and forms one piece with, the rest of the outer tube, in the process of vulcanization. Those portions of the linen, which are folded over upon one another, are prevented from adhering by the insertion of a layer of tissue paper, or soapstone, soapsuds, glycerine, or mixtures thereof, or of some other substance, suitable to prevent adhesion. The holes for the lacings are made through the inner part of the outer tube, with which the lower half of the linen is incorporated, and these holes should preferably be removed to quite a distance from the edges of the slit, in order to prevent the lacings from cutting through. When the interior tube has been put in position, with the exterior tube around it, and when the aperture in the interior of the outer tube has been closed by the lacings, there still remains an aperture in the exterior of the outer tube, forming as it were a pocket, in which the lacings and the protecting strip of linen or other fibrous material appear. The slit in the outer part of the exterior tube is then closed by a strip, which should preferably be of very light sheeting, friction-coated, which is cemented over the slit. In case of puncture, the strip, which covers the slit in the rim portion of the tire, can readily be removed. The lacings can then be undone, the inner tube can then be removed, repaired, and replaced; the outer tube can be laced together and the strip can be placed over the slit. There is no obstruction to the free passage of the lacings, through the presence of cement, and the danger of injury to the lacings has been obviated. The lacings are protected by the outer portions of the outer tube, and by the strip which covers the slit in the rim portion. The parts of the tire through which the lacings pass have been strengthened, so that they are not liable to be injured by the lacings.

The piece of linen or other fibrous material, heretofore described, may of course extend throughout the entire circumference of the outer tube, without departing from the spirit of my invention, but this is generally not desirable, because it is generally preferable that the tire should have more elasticity than the linen or fibrous material ordinarily affords. Where an inelastic or rigid tire is desired, this linen strip may be made continuous throughout the tire, not only without detriment, but sometimes with advantage.

The linen strip, in place of being folded over upon itself, within the different layers of the outer tube, and along the line of the edges of the rim part, may be composed of separate pieces placed one over the other. I deem the single piece folded upon itself to be preferable. It makes a more perfect joint and is more durable. One thickness of linen or other fibrous material in this part of the tire will give some of the desired advantages.

To further protect the inner tube, I prefer that on the outside of the inner tube, there should be a strip or layer of duck or similar material, cemented to that portion of the inner tube which is designed to be adjacent to the lacings above it. This strip, in place of being cemented may be in the form of a loose tongue.

In the accompanying drawing, which will serve to illustrate my invention, I have shown a perspective sectional view of the improvement.

A represents the interior of inflation tube, having a strip of duck or similar material $a$, cemented thereto or incorporated therewith over that portion which is adjacent to the lacings. The protective tube or rim portion of the tire is composed of the layers B, B′ having slits $b$, $b'$ therein at suitable intervals. That part of the layers B, B′ which is directly over the rim of the wheel and in which the slots are made, is preferably thicker than the rest of said layers.

C is a piece of linen or other fibrous material which is laid along the layer B at the point where the slit $b$ is to be formed. The edges of this piece are folded over thereupon so that they meet at substantially the line of the slit. The material C is then cemented to the outer face of the layer B′ and the inner face of layer B and a slit corresponding to the slit $b'$ in the latter, is formed therein. Holes $d$ for the lacings D are made in the layer B at the edges of the slit.

E is a closing strip for the slit in the outer layer B′.

What I claim, and desire to secure by Letters Patent, is—

1. A pneumatic tire, containing an outer tube, and a tube within the same, capable of being moved within the outer tube, the outer tube being provided with one or more slits, the sides of which are united by lacings, which lacings are protected by a closed pocket, substantially as described.

2. A pneumatic tire, containing an outer tube, and a tube within the same, capable of being moved within the outer tube, the outer tube being provided with one or more slits, the sides of which are united by lacings, which lacings are protected by a pocket, the outlet of the pocket being closed by a removable strip cemented over the same, or otherwise united to the outer tube, substantially as described.

3. A pneumatic tire, containing an outer tube, and a tube within the same, capable of being moved within the outer tube, the outer tube being provided with one or more slits, sides of which are united by lacings, which lacings are protected by a closed pocket, and the inner tube being further protected by a strip over that part of the tube, which is designed to be adjacent to the lacings in the outer tube, substantially as described.

4. A pneumatic tire, having one or more slits in the outer tube of the tire whereby access can be had to the interior of the tube, provided with lacings and lacing holes, whereby the same can be closed, which lacings are protected by a pocket, substantially as described.

5. A pneumatic tire, having one or more slits in the outer tube of the tire, whereby access can be had to the interior of the tube, provided with lacings and lacing holes, whereby the same can be closed, that portion of the tube, which is adjacent to the slits, being strengthened by one or more layers of linen, or other fibrous material, substantially as described.

6. A pneumatic tire, having one or more slits in the outer tube of the tire, whereby access can be had to the interior of the tube, provided with lacings and lacing holes, whereby the same can be closed, that portion of the tube, which is adjacent to the slits, being strengthened by a strip of linen or other fibrous material, folded upon itself, and firmly united to the tube by vulcanization, substantially as described.

In testimony whereof I have signed this specification in the presence of two subscribing witnesses.

FRED. W. HARDWICK.

Witnesses:
WM. KENT,
W. W. SCOTT.

Correction in Letters Patent No. 501,716.

It is hereby certified that the assignee, "The New York Belting and Packing Company, Limited," in Letters Patent No. 501,716, granted July 18, 1893, upon the application of Frederick W. Hardwick, of Passaic, New Jersey, for an improvement in "Pneumatic Tires," should have been described and specified as *The New York Belting and Packing Company, Limited, of Great Britain*, instead of "The New York Belting and Packing Company, of England"; and that the said Letters Patent should be read with this correction therein that the same may conform to the record of the case in the Patent Office.

Signed, countersigned, and sealed this 22d day of August, A. D. 1893.

[SEAL.]

JNO. M. REYNOLDS,
*Assistant Secretary of the Interior.*

Countersigned:

S. T. FISHER,
*Acting Commissioner of Patents.*